United States Patent
Weber et al.

(10) Patent No.: US 10,476,413 B2
(45) Date of Patent: Nov. 12, 2019

(54) METHOD FOR DETERMINING THE ABSOLUTE POSITION OF A ROTOR OF A LINEAR MOTOR

(71) Applicant: B&R INDUSTRIAL AUTOMATION GMBH, Eggelsberg (AT)

(72) Inventors: Andreas Weber, Salzburg (AT); Manuel Plainer, Weissenkirchen (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 15/918,391

(22) Filed: Mar. 12, 2018

(65) Prior Publication Data
US 2018/0262133 A1 Sep. 13, 2018

(30) Foreign Application Priority Data
Mar. 13, 2017 (AT) .............................. A 50198/2017

(51) Int. Cl.
*H02P 6/16* (2016.01)
*G01D 5/14* (2006.01)
(Continued)

(52) U.S. Cl.
CPC ............... *H02P 6/16* (2013.01); *G01D 5/145* (2013.01); *H02K 11/215* (2016.01);
(Continued)

(58) Field of Classification Search
CPC .. H02P 3/24; H02P 6/006; H02P 21/32; H02P 6/186; H02P 6/183; H02P 2207/05
See application file for complete search history.

(56) References Cited

U.S. PATENT DOCUMENTS

| | | | | |
|---|---|---|---|---|
| 4,700,189 A | * | 10/1987 | Welburn | ................. H02K 29/03 310/158 |
| 5,587,852 A | * | 12/1996 | Yoshiura | ................. G11B 5/553 310/12.08 |

(Continued)

FOREIGN PATENT DOCUMENTS

| | | |
|---|---|---|
| DE | 10 2006 032 989 | 1/2008 |
| EP | 1195880 | 4/2002 |

(Continued)

OTHER PUBLICATIONS

Austria Search Report conducted in counterpart Austria Appln. No. A 50198/2017 (dated Oct. 17, 2017).

(Continued)

*Primary Examiner* — Rina I Duda
(74) *Attorney, Agent, or Firm* — Greenblum & Bernstein, P.L.C.

(57) ABSTRACT

Linear motor and method to determine absolute position of a rotor movable with respect to a stationary part in a direction of movement, without movement of rotor, without additional permanent magnets, without a close arrangement of position sensors, and also during large movements of rotor, at least one edge area of an arrangement of drive magnets is determined, and rough position of rotor is derived, and using known geometry of rotor, specific drive magnet of the arrangement of drive magnets is determined whose magnetic field is detected by at least one of the position sensors in the area of the arrangement of drive magnets. At least one position sensor determines a relative position of measured drive magnet with respect to the at least one position sensor, and absolute position of rotor is determined from known mounting position of this at least one position sensor and from determined relative position.

12 Claims, 4 Drawing Sheets

(51) Int. Cl.
*H02K 41/03* (2006.01)
*H02K 11/215* (2016.01)
*H02K 41/035* (2006.01)
*H02P 6/00* (2016.01)
*H02P 25/06* (2016.01)

(52) U.S. Cl.
CPC ....... *H02K 41/031* (2013.01); *H02K 41/0356* (2013.01); *H02P 6/006* (2013.01); *H02P 25/06* (2013.01); *H02K 2213/03* (2013.01)

(56) References Cited

U.S. PATENT DOCUMENTS

| | | | |
|---|---|---|---|
| 5,873,267 A * | 2/1999 | Otobe | D04B 23/00 66/204 |
| 6,876,107 B2 | 4/2005 | Jacobs | |
| 7,538,460 B2 * | 5/2009 | Labriola, II | H02K 29/12 310/184 |
| 7,746,023 B2 * | 6/2010 | Ajima | H02P 6/10 318/700 |
| 7,932,684 B2 | 4/2011 | O'Day et al. | |
| 7,969,144 B2 * | 6/2011 | Jajtic | H02K 11/215 324/207.2 |
| 7,994,742 B2 | 8/2011 | O'Day | |
| 8,294,391 B2 * | 10/2012 | Kubo | H02P 3/24 310/12.19 |
| 2002/0049553 A1 | 4/2002 | Schmid et al. | |
| 2010/0176806 A1 | 7/2010 | O'Day et al. | |
| 2011/0050007 A1 | 3/2011 | Kubo | |
| 2013/0037384 A1 | 2/2013 | Reinisch | |
| 2013/0074724 A1 * | 3/2013 | King | E01B 25/34 104/130.02 |

FOREIGN PATENT DOCUMENTS

| | | |
|---|---|---|
| EP | 2869035 | 5/2015 |
| JP | 2006-333612 | 12/2006 |
| KR | 101617244 | 5/2016 |

OTHER PUBLICATIONS

Europe Search Report/Office Action conducted in counterpart Europe Appln. No. 18160782.1 (dated Jul. 11, 2018) (w/ machine translation).

Europe Search Report/Office Action conducted in counterpart Europe Appln. No. 18201733.5 (dated Mar. 6, 2019) (w/ machine translation).

* cited by examiner

METHOD FOR DETERMINING THE ABSOLUTE POSITION OF A ROTOR OF A LINEAR MOTOR

CROSS-REFERENCE TO RELATED APPLICATIONS

The present application claims priority under 35 U.S.C. § 119(a) of Austria Patent Application No. A50198/2017 filed Mar. 13, 2017, the disclosure of which is expressly incorporated by reference herein in its entirety.

BACKGROUND OF THE INVENTION

1. Field of Invention

The present invention relates to a method for determining the absolute position of a rotor of a linear motor that is movable with respect to a stationarily part in a direction of movement, wherein an arrangement of drive magnets in the form of a plurality of drive magnets arranged adjacently in the direction of movement of the rotor is provided on the rotor, and a plurality of position sensors are stationary arranged at a distance from one another on the stationary part in the direction of movement of the rotor, wherein a magnetic field of a drive magnet of the arrangement of drive magnets in the area of a position sensor is detected by a position sensor. The invention further relates to a linear motor with determination of the absolute position according to the invention.

2. Discussion of Background Information

Linear motors are characterized in that a movable part (the rotor) is moved with respect to a stationary part (the stator) as the result of interacting magnetic fields. For this purpose, a drive magnet (electromagnet or permanent magnet) is situated on one of the two parts, and interacts with the magnetic field, which is generated by an energized drive coil on the other part, in order to generate a linear propulsion force. When a voltage is applied to the drive coil, a magnetic field results which interacts with the magnetic field of the drive magnet, thereby generating a force on the movable part, which moves the movable part. To move the rotor, a moving magnetic field is generated by appropriate actuation of the drive coils. This basic motor principle is of course well known, and therefore does not require further discussion here. In principle it is also irrelevant whether the drive coils are provided on the moving part (rotor) or the stationary part (stator).

In order to control the movement of the rotor of a linear motor, it is absolutely necessary to know its actual position relative to the stator to be able to correctly energize the drive coils in order to generate the moving magnetic field. Therefore, determining the position of the rotor plays an important role. It is particularly difficult to determine the actual position of the rotor when the linear motor is being switched on, since it is not possible to know the location of the rotor in advance at the time of switching on. Various methods have already been proposed for position determination when the linear motor is being switched on.

U.S. Pat. No. 7,932,684 B2 describes a linear motor, for example, which for position determination additionally includes position magnets situated on the rotor and stationary position sensors (situated on the stator, for example). When the rotor is moved, the position magnets move relative to the position sensors, and the actual position of the rotor relative to the stator may be determined. The position magnets include a first series of a number of adjacently situated permanent magnets that interact with an incremental sensor, and a second series of a number of adjacently situated permanent magnets that interact with an absolute sensor. The absolute sensor, for example a Hall sensor, is designed in such a way that it provides only two states, whereby the state is changing at a defined position of the rotor. The incremental sensor, for example a magnetoresistive sensor, is designed in such a way that it provides many recurring sensor cycles, whereat the position may be determined very accurately within a sensor cycle. During switching on, it is first necessary to carry out "homing", i.e., referencing of a predefined, known zero position. For this purpose, the rotor is moved until the absolute sensor detects a state change, with which the zero position is determined. Starting from the zero position, the actual position of the rotor may then be incrementally determined by counting the number of sensor cycles, and carrying out a fine determination of the position within the sensor cycles. In U.S. Pat. No. 7,932,684 B2, a reference run is therefore necessary for determining the position of the rotor during switching on. However, achieving this type of position detection is meaningful only for relatively limited ranges of motion of the rotor. For many applications, in particular for linear motors having a large range of motion, or for long stator linear motors having a plurality of rotors, this type of position determination is of course totally unsuitable.

The determination of an absolute position, also when the linear motor is being switched on, is ascertainable from U.S. Pat. No. 7,994,742 B2. An elongated position magnet is situated on the rotor over the possible range of motion, and is arranged in such a way that a position-dependent offset in the transverse direction results. A position sensor which detects the magnetic field of the position magnet is situated on a stationary structure, for example the stator. Due to the offset, at each position of the rotor a distinct magnetic field results which is detected by the position sensor. A conclusion concerning the actual position of the rotor may thus be immediately drawn, without movement of the rotor, also when the linear motor is being switched on. However, the range of motion is of course restricted to the length of the position magnet, and therefore is very limited. For many applications, in particular for linear motors having a large range of motion, or for long stator linear motors having a plurality of rotors, this type of position determination is of course totally unsuitable.

U.S. Pat. No. 6,876,107 B2 describes a known long stator linear motor as a linear motor. Such a long stator linear motor includes a plurality of drive coils, stationarily situated next to one another, which form the stator of the long stator linear motor. A plurality of rotors that may be moved along the stator may be situated along the stator. Each rotor bears a drive magnet. In order to move the rotor, the drive coils which at that moment interact with a rotor are energized. In this way, individual rotors may be moved independently of one another along the stator. Such long stator linear motors are frequently used in flexible transport systems, for example in a production process or in conveying technology. U.S. Pat. No. 6,876,107 B2 also describes the determination of a true absolute position, which allows the exact position of a rotor to be determined immediately when the long stator linear motor is being switched on, without having to carry out referencing (for example, by a reference run of the rotor). This is of course very advantageous, in particular considering that it is not uncommon for several hundred rotors to be simultaneously present in a long stator linear motor. For this purpose, exactly one additional position magnet on a rotor, and a plurality of position sensors, for example magnetoresistive sensors, which detect the magnetic field of the position magnet, is/are situated along the stator. However, the position sensors must be arranged closely enough together to ensure that at any point in time, at least one position sensor can detect the magnetic field of the position magnet. When the long stator linear motor is switched on, at least one position sensor thus responds for each rotor, thereby enabling position determination without referencing the rotor. The disadvantage is that an additional position magnet is necessary, and the position sensors must be situated very closely together, which requires a large number of such position sensors.

SUMMARY OF THE EMBODIMENTS

Embodiments of the present invention provide a method for determining the absolute position of a rotor of a linear motor, which requires neither movement of the rotor nor an additional permanent magnet nor a close arrangement of position sensors, and which also allows large movements of the rotor.

According to embodiments, at least one edge area of the arrangement of drive magnets is determined, and a rough position of the rotor is derived therefrom, on the basis of which, using the known geometry of the rotor, the specific drive magnet of the arrangement of drive magnets is determined whose magnetic field is detected by at least one of the position sensors in the area of the arrangement of drive magnets, wherein the at least one position sensor determines a relative position of the measured drive magnet with respect to the at least one position sensor, and the absolute position of the rotor is determined from the known mounting position of this at least one position sensor and from the determined relative position. With this method, the absolute position may be easily determined without the need for referencing and without using additional position magnets, and even though the distance between the position sensors may be selected to be greater than the pole pitch of the drive magnets. The invention makes use of the properties of the magnetic field of the arrangement of drive magnets in order to detect the edge area of the arrangement for rough positioning. Due to the known geometric conditions, it is thus possible to determine the particular drive magnet whose magnetic field is detected by a position sensor in the area of the arrangement, which is sufficient for the rough positioning. The exact positioning then takes place based on the sensor signal of the position sensor. With this method, the position sensors may thus also be situated relatively far apart, in any case farther apart than the pole pitch of the drive magnet, as the result of which position sensors may also be spared.

In particular for position sensors that are situated far apart, it is advantageous when, for determining the absolute position of the rotor, the number of drive magnets measured in succession with the at least one position sensor is considered as an increment. In this way, a position sensor may be used for position determination, as long as the arrangement of drive magnets is located in the area thereof. It is advantageous when, according to a predefined criterion, it is switched to a position sensor that is following in the direction of movement of the rotor in order to determine the absolute position of the rotor. Measurements may thus always be carried out in the area of a favorable field line pattern of the magnetic field, which increases the accuracy.

For determining the at least one edge area, it is advantageous to determine and evaluate a physical variable that is a function of the magnetic field of the drive magnets. Use is thus made of the fact that the magnetic field situated away from a drive magnet or away from the arrangement of drive magnets, i.e., exactly in the sought edge area, drops quickly and sharply, or no longer extends perpendicularly with respect to the drive magnets, thus enabling reliable determination of the edge area.

For this purpose, as the physical variable an absolute value of a sensor signal of a position sensor in the area of the arrangement of drive magnets may be determined, and a conclusion concerning an edge area may thus be drawn, preferably when the absolute value falls below a predefined threshold value.

Alternatively, the inductance of a drive coil in the area of the arrangement of drive magnets may be determined, and a conclusion concerning an edge area may thus be drawn, preferably when the inductance falls below a predefined threshold value.

As another alternative, a sensor signal cycle of a position sensor that is nonlinearly distorted due to the magnetic field of the arrangement of drive magnets may be used for determining a relative position of a drive magnet of the arrangement of drive magnets with respect to the position sensor, and on this basis the sensor distance from another position sensor in the area of the arrangement of drive magnets is determined, and a conclusion concerning an edge area is thus drawn, preferably when the sensor distance determined based on the distorted sensor signal cycle falls below a predefined threshold value.

Since the reliability of the methods may differ, for example depending on the position of the rotor, methods for determining the edge area may also advantageously be combined in order to improve the reliability in determining the absolute position.

Other exemplary embodiments and advantages of the present invention may be ascertained by reviewing the present disclosure and the accompanying drawing.

BRIEF DESCRIPTION OF THE DRAWINGS

The present invention is explained in greater detail below with reference to FIGS. 1 through 7, which schematically show advantageous embodiments of the invention by way of example, in a non-limiting manner. In the figures.

DETAILED DESCRIPTION OF THE EMBODIMENTS

Figure 1:
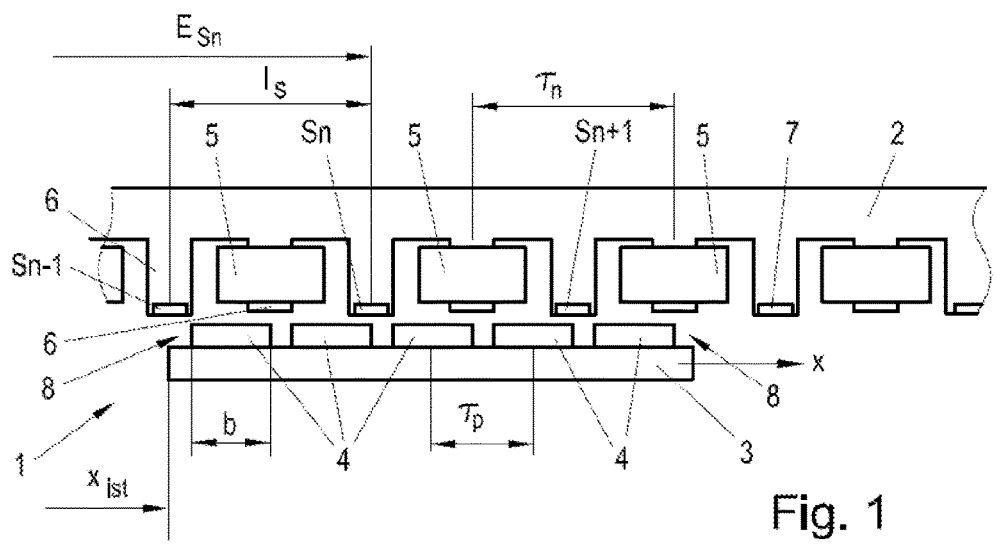
FIG. 1 shows a design of a linear motor.

The invention is described below, without limitation, with reference to a linear motor 1 having drive magnets 4 on the rotor 3 and having stationary drive coils 5 on the stator 2, as illustrated in FIG. 1. Such a configuration is generally found in long stator linear motors. Permanent magnets or electromagnets are suitable as drive magnets 4. In the embodiment shown, the stator 2 is designed with an iron core having teeth 6 (generally a laminated core), and a drive coil 5 is situated on every other tooth. Of course, the stator 2 may also have a coreless design, or a drive coil 5 may be situated on every tooth 6 of a core.

It is assumed in the invention that multiple drive magnets 4 (i.e., more than one drive magnet) are generally always situated on the rotor 3 of the linear motor 1. To avoid a dedicated, additional position magnet on the rotor 3, these drive magnets 4 are now at the same time also used for the position determination. As is known, The distance between two drive magnets 4 (from pole center to pole center) is referred to as the pole pitch $\tau_p$ and the distance between two drive coils 5 (from pole center to pole center) is referred to as the slot pitch $\tau_n$. It is assumed in the invention that the position sensors Sn (n is an index that stands for all position sensors, i.e., S1, S2, . . . ) are stationarily arranged at a sensor distance $l_s$ that is greater than the pole pitch $\tau_p$. The number of position sensors required may be reduced as a result of this arrangement. In the exemplary embodiment shown, a position sensor Sn is arranged on every other tooth 6 of the stator 2, preferably the tooth without a drive coil 5, as the result of which the sensor distance $l_s$ corresponds to the slot pitch $\tau_n$, which, however, is not absolutely necessary.

The drive magnets 4 may be situated directly next to one another, or also with a distance between them, as illustrated in FIG. 1. In the first case, the width b of a drive magnet 4 corresponds to the pole pitch $\tau_p$. Since the individual magnetic fields of the drive magnets 4 overlap, the magnetic field in the area of the spacing between the drive magnets 4 drops by only a slight amount. For this purpose, of course, the distance should not be too great, whereat the reliable or acceptable distance is naturally a function of the strength of the drive magnets 4.

Figure 2:
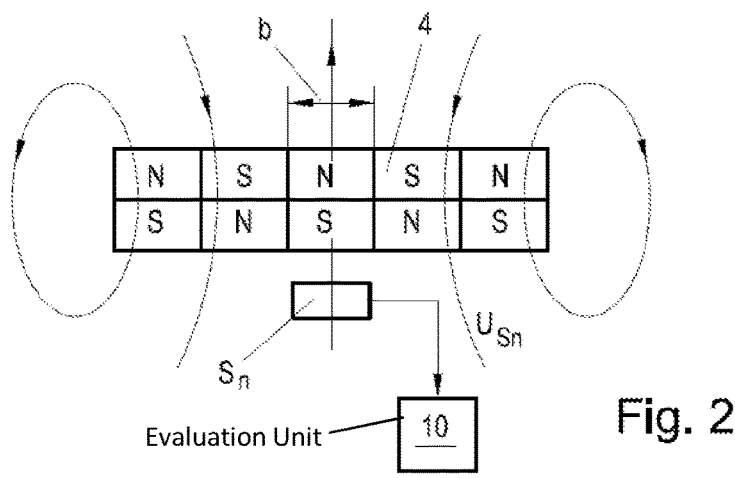
FIGS. 2 and 3 show the detection of a magnetic field of a drive magnet, using a position sensor.
Figure 3:
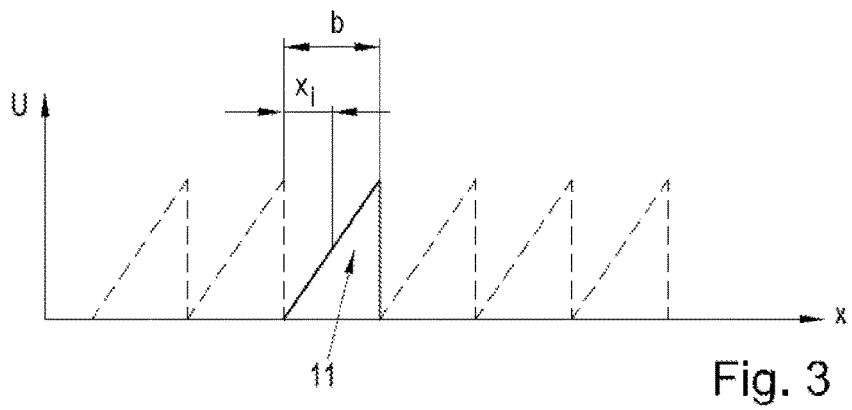

In the position of the rotor 3 shown in FIG. 1, the position sensor Sn would deliver a given sensor signal $U_{Sn}$. As position sensors, well-known sensors are used that measure the magnetic field of the drive magnets 4 or a property of the magnetic field, for example the magnetic field intensity (a Hall sensor, for example) or the direction of the magnetic field (a magnetoresistive sensor, for example). Magnetoresistive sensors are also possible. Such sensors generate a sensor signal $U_{Sn}$, for example a voltage in the form of a sin/cos pattern, when a drive magnet 4 moves in front of the sensor. Based on this pattern, a sensor signal cycle 11, for example a recurring sawtooth voltage, is generally calculated, within which the position $x_i$ of the drive magnet relative to the sensor may be determined. This is illustrated in FIGS. 2 and 3, using the example of a magnetoresistive sensor as position sensor Sn. The position sensor Sn detects the magnetic field angle α of the magnetic field (indicated by the field lines in FIG. 2), from which a sensor signal $U_{Sn}$ in the form of an electrical sin(α)/cos(α) signal is obtained. On this basis, a sawtooth voltage may be determined as the sensor signal cycle 11, by using the atan or atan 2 angular function (atan 2 corresponds to atan, taking into account the individual arguments of the function with the proper algebraic sign). Every voltage of the sawtooth is associated with a distinct position $x_i$ of the drive magnet 4 relative to the position sensor Sn. Depending on the resolution of the sensor signal cycle 11 in an evaluation unit 10, the position $x_i$ may be determined with more or less accurate resolution. Since the mounting position of the position sensor Sn and the structural and geometric design of the rotor are of course known, the absolute position of the rotor 3 may thus be determined, provided that it is known from which drive magnet 4 the magnetic field, measured with the position sensor Sn, originates.

If the rotor 3 were now shifted by the pole pitch $\tau_p$ in the direction of movement x in FIG. 1, the same position sensor Sn would deliver the same signal, except that it would originate from a different drive magnet 4, since the sensor signal cycle 11 repeats. This leads to ambiguity, as the result of which a distinct position of the rotor 3 is not determinable when the linear motor 1 is switched on, since it is not known which magnetic held is detected by a sensor Sn.

To eliminate this problem, when the linear motor 1 is switched on the effect of the magnetic fields of preferably all drive magnets 4 of the rotor 3 is evaluated according to the invention. In particular the edge area 8 (viewed in the direction of movement x) of the arrangement of drive magnets 4 is thus to be detected. The edge area 8 is formed in the area of the first and last drive magnets, viewed in the direction of movement x, since it is known that the magnetic field generated by the drive magnets 4 drops quickly and sharply away from the drive magnet 4. Thus, the magnetic field at the edge of the arrangement of drive magnets 4 (i.e., next to the first and last drive magnets 4), i.e., in the region of the edge area 8, likewise drops quickly and sharply, whereas little or no drop is to be expected in the center of the arrangement of drive magnets 4 due to the overlap of the magnetic fields. This is utilized according to the invention in order to detect the edge area 8 of the arrangement of drive magnets 4. When the edge areas 8 or at least one edge area 8 of the arrangement of drive magnets 4 are/is known, on this basis (once again, from knowledge of the structural and geometric design of the rotor 3) it may be determined from which drive magnet 4 the magnetic field, measured with the position sensor Sn, originates, since the arrangement of the drive magnets 4 must lie between the two edge areas 8. However, for determining this association, it may of course be sufficient to determine only one edge area 8. There may also be a situation in which multiple rotors 3 are situated in direct succession, viewed in the direction of movement x, so that between two detected edge areas 8 a distance is present that is greater than the known length of a rotor 3. For example, in this case it is also sufficient to detect one edge area 8 for the rough positioning of a rotor 3, and based on the great distance, it is even possible to draw conclusions concerning the presence of multiple rotors 3. Of course, the association between drive magnets 4 and position sensors Sn may also be made for all position sensors Sn in the area of the arrangement of drive magnets 4. Thus, based on the known geometric conditions, the specific drive magnet whose magnetic field is detected by the particular position sensor Sn may be assigned to each position sensor Sn in the area of the arrangement of drive magnets 4. The above-described ambiguity is thus eliminated. With this knowledge of the association of the drive magnet 4 with the position sensor Sn, at least one arbitrary position sensor Sn in the area of the arrangement of drive magnets 4 may thus be read out with regard to the position $x_i$.

In principle, it is irrelevant which position sensor Sn in the area of the arrangement of drive magnets 4 between the edge areas 8 is used for the position determination. For determining the position of the rotor 3, it is of course sufficient to use only one position sensor Sn in the area of the drive magnets 4. This may in principle be an arbitrary position sensor Sn. However, the position sensor Sn that is closest to the center of the arrangement of drive magnets 4 is preferably used, since the pattern of the field lines of the magnetic field of the drive magnets 4 is more favorable in this area due to the fact that the field lines meet the position sensor Sn at approximately a right angle (see FIG. 2). However, it would of course also be possible to use multiple position sensors Sn for the position determination, and to use the absolute position $x_{ist}$ of the rotor 3, for example, as the average value of the determined positions of all position sensors Sn used, or to utilize the redundant determination of the absolute position $x_{ist}$ for verification.

However, this association of the drive magnet 4 with the position sensor Sn may take place with only limited accuracy, for which reason reference is also made to rough positioning. Due to this inaccuracy, however, the case may arise that it is not possible to reliably determine from which drive magnet 4 the magnetic field, measured with the position sensor Sn, originates. In this case, another, unequivocally associatable position sensor Sn may easily be used for determining, the absolute position $x_{ist}$. However, the sensor signal cycle 11 of the position sensor Sn could also be used as an additional information source for the rough positioning. The case of unclear associability will arise in the area around the end of a sensor signal cycle 11 and the beginning of the adjacent sensor signal cycle 11. Depending on which value the position sensor Sn outputs, a conclusion concerning one drive magnet 4 or the other may then be drawn.

Since the mounting position $E_{Sn}$ of the selected position sensor Sn is stationary and known, the actual, exact (within the predefined sensor resolution) absolute position $x_{ist}$ of the rotor 3 of the linear motor 1 can be determined using the known mounting position $E_{Sn}$ of the position sensor Sn and the determined relative position $x_i$ of the drive magnet 4 with respect to the position sensor Sn, and of course also based on the known geometry of the rotor 3 (which of course also includes the geometry (pole pitch $\tau_p$, number, and/or width of the drive magnets 4, etc.) of the arrangement of drive magnets 4.

The further position determination during movement of the rotor 3 then takes place incrementally, for example. For this purpose, the position sensor Sn is initialized with the index N of the thus currently measured drive magnet 4 as the starting increment SI. The selected position sensor Sn, for example, may then be used for the position detection as long as it is situated in the area of the drive magnets 4. The sensor signal cycles 11 are counted as the increment I, and the exact position $x_i$ of the measured drive magnet 4 is determined within a sensor signal cycle 11. It is then switched to the next position sensor Sn+1, viewed in the direction of movement x, and the position sensor Sn+1 is initialized with the index N of the thus currently measured drive magnet 4 as the starting increment SI. The absolute position $x_{ist}$ is then once again incrementally determined. The number of sensor signal cycles 11 measured with the position sensor Sn, i.e. the number of drive magnets 4 measured with the new position sensor Sn+1, is of course also counted as the increment I until it is switched to the next position sensor Sn+2, and is used for incrementally determining the absolute position $x_{ist}$. The further switching to the next position sensor Sn+1 takes place according to a predefined rule, and occurs, for example, when the next position sensor Sn+1 is closer to the center of the arrangement of drive magnets 4 than is the preceding position sensor Sn.

The absolute position of the rotor 3 is of course determined with regard to a known, generally stationary, reference position. A rotor 3 of a linear motor 1 moves, for example, between two extreme points which establish the maximum range of motion of the rotor 3. An extreme point may then be used as a reference position. For a long stator linear motor as the linear motor 1, in which a closed path is often defined for the movement of the rotor 3, for example a point on the stationary path is defined as the reference position. The mounting positions $E_{Sn}$ of the position sensors Sn are likewise known with regard to this reference position.

To determine the at least one edge area 8 of the arrangement of drive magnets 4 on the rotor 3, a physical variable that is a function of the magnetic field of the drive magnets 4 is determined and evaluated, as described below with reference to two specific embodiments.

Figure 4:
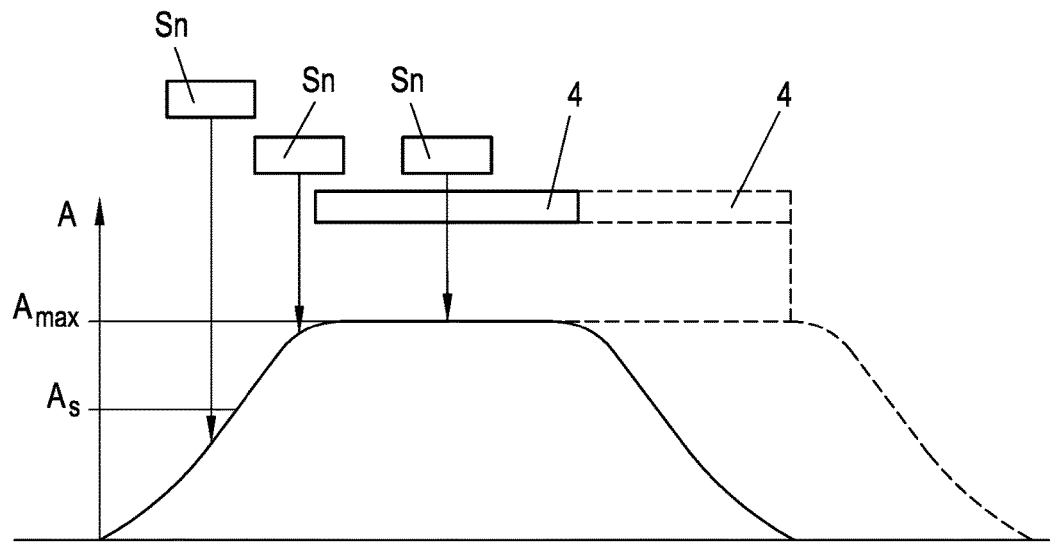
FIG. 4 shows a possible method for determining an edge area of the arrangement of drive magnets on the rotor.

The first exemplary embodiment is once again described with reference to a magnetoresistive sensor as a position sensor Sn, without limitation to generality. It is known that the sensor signal of such a magnetoresistive sensor is a function of the magnetic field angle α of the magnetic field that impinges on the sensor. The magnetoresistive sensor outputs the sine and cosine of this magnetic field angle α, for example $U_A$=U sin(α) and $U_B$=U cos(α), and the relative position $x_i$ of the measured drive magnet 4 with respect to the position sensor Sn is directly proportional to this magnetic field angle α in the form $$x_i = K \mathrm{atan2}\left[\frac{U_B}{U_A}\right],$$

with a constant K that is predefined by the position sensor Sn. For determining the edge area 8, the amplitude A of the sine and cosine track, as a physical variable that is a function of the magnetic field of the drive magnets, is now evaluated, whereas the amplitude A being defined as $A=\sqrt{U_A^2+U_B^2}$. In the saturation area of the position sensor Sn, i.e., when the drive magnet 4 is located opposite from the position sensor Sn, the amplitude $A_{max}$ will be at a maximum. If the drive magnet 4 is not entirely located opposite from the position sensor Sn, the saturation area is departed and the amplitude A will drop. This is illustrated in FIG. 4 for a drive magnet 4, and with various indicated relative positions with respect to a position sensor Sn. In an arrangement of drive magnets 4, the saturation area is correspondingly extended, as indicated by dashed lines in FIG. 4. It is thus possible to detect the edge area 8 of the arrangement of drive magnets 4 by evaluating the amplitude A. A threshold value $A_S$, for example 80% $A_{max}$, may be set for the amplitude A and the edge area being detected when the amplitude falls below the threshold value $A_S$.

Figure 5:
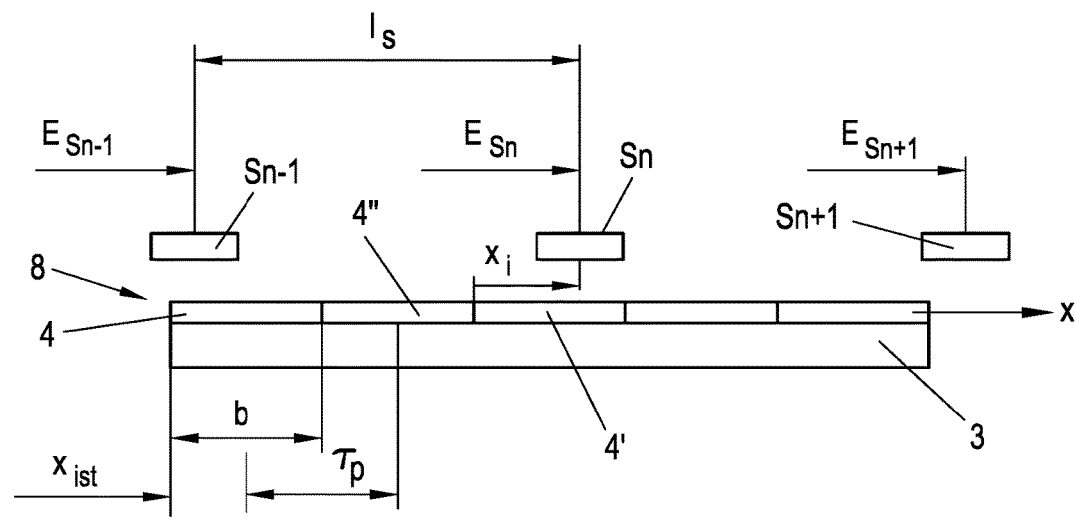
FIG. 5 shows the determination according to the invention of the absolute position of the rotor.

In FIG. 5 an edge area is detected with the position sensor Sn−1, for example, due to the fact that the amplitude A of this sensor is less than a set threshold value $A_S$. The position sensor Sn−1 is thus not in saturation, as the result of which the determination of the relative position $x_i$ is no longer very accurate. However, it is sufficient for determining a rough position of the rotor 3, since for this purpose only the absolute values are needed. Thus, based on the known geometric relationships the particular drive magnet 4' whose magnetic field is at that moment detected by the position sensor Sn can be determined by determining the position of an edge area 8 as a rough position. Since the distance $l_s$ and the pole pitch $\tau_p$ are known, it is easy to determine the associated drive magnet 4'. The index N of the determined drive magnet 4' in the arrangement of drive magnets 4 on the rotor 3 is thus likewise known. In the example in FIG. 5, the third drive magnet 4' would be associated with the position sensor Sn, so that the index N would be 3. After the associations of the drive magnets 4 with the respective position sensors Sn in the area of the arrangement of drive magnets 4 have thus taken place on the rotor, a position sensor Sn may now be selected according to a predefined selection criterion, and is used for an exact determination of the absolute position $x_{ist}$. For example, the position sensor Sn that is closest to the center of the arrangement of drive magnets 4 is selected. The center is easily known from $(k \cdot \tau_p)/2$, where k is the number of drive magnets 4 in the arrangement. Based on the known geometry of the rotor 3 and the arrangement of drive magnets 4, as well as the knowledge of the arrangement of the position sensors Sn, the specific drive magnet 4' of the arrangement of drive magnets 4, whose magnetic field is measured by the selected position sensor Sn, is thus known. The index N of the drive magnet 4', which is associated with the position sensor Sn, is used as the starting increment SI, i.e., SI=N, and in the example according to FIG. 5 SI=3 due to the fact that the magnetic field of the third drive magnet is detected by the selected position sensor Sn. The exact relative position $x_i$ may then be determined with the selected position sensor Sn, which is in saturation. When the rotor 3 is now moved further in the direction of movement x, at some time the position sensor Sn will detect the magnetic field of the following drive magnet 4". It may therefore also be necessary to count an increment I for the number of sensor signal cycles 11, as long as the absolute position $x_{ist}$ of the rotor is determined with the position sensor Sn and various drive magnets 4', 4" are measured. The absolute position $x_{ist}$ of the rotor 3 then results, for example, from $x_{ist}=[(E_{Sn}-x_i)-(SI-1) \cdot \tau_p]$. In the example according to FIG. 5, the starting increment SI at the beginning is 3, and the increment I=1 as long as the drive magnet 4' is measured. When the drive magnet 4" is measured, the increment I is increased to 2. Of course, the increment I must be counted according to the direction of movement x. In the example according to FIG. 5, if the rotor 3 were moved in the opposite direction, the increment I for the next drive magnet would naturally have to be decreased by one.

Many other options for calculating the exact absolute position $x_{ist}$ of the rotor 3 are of course conceivable, depending on the specific implementation. In particular, in the example according to FIG. 5 it would also be possible to use the edge area in the area of the position sensor Sn−1 for the rough positioning. However, the basic principle always remains the same. By determining the at least one edge area 8 and associating a drive magnet 4' with a position sensor Sn, a rough position of the rotor 3 is initially determined, from which the absolute position $x_{ist}$ may then be determined, based on the known geometry of the rotor 3, the known mounting position $E_{Sn}$ of the position sensor Sn, and the relative position $x_i$ thus determined. This takes place in the evaluation unit 10, for example.

At some time during movement of the rotor 3 in the direction of movement x, it is of course also necessary to switch over to the next position sensor Sn+1 for position detection, for example when the next position sensor Sn+1 is closer to the center of the arrangement of drive magnets 4 than is the position sensor Sn. A suitable criterion may be predefined for this switching. The above procedure is then repeated. The index N of the drive magnet 4, whose magnetic field is detected by this position sensor Sn+1 when a switch is made to the next position sensor Sn+1, is used as the starting increment SI. The increment I is set to 1, for example, and the absolute position $x_{ist}$ is again calculated as above.

If one end of the arrangement of drive magnets 4 cannot be determined as the edge area 8, for example because no position sensor Sn in this area delivers a usable signal, the other end may be evaluated. Of course, both edge areas 8 may also be evaluated at both ends of the arrangement of drive magnets 4 for the rough positioning.

An alternative option for determining an edge area 8 makes use of the inductance values of the drive coils 5 when the rotor 3 is at a standstill, for example once again when the linear motor 1 is being switched on. The underlying concept is that the inductance L of a drive coil 5 has a certain value. However, this inductance L, as a physical variable that is a function of the magnetic field of the drive magnets, is influenced by the additional magnetic field of the drive magnets 4 when a drive magnet 4 is located in the area of a drive coil 5. The drive coil 5 may be modeled as a series connection of an ohmic resistance R and the inductance L. From the resulting differential equation $$u = R \cdot i + L \frac{di}{dt},$$

the current i may be calculated from $$i(t) = \frac{u}{R}\left(1 - e^{-\frac{R}{L}t}\right).$$

If a voltage jump $u=u_0$ is now applied to the drive coil 5 and the resulting current i is measured as the response, for example the current rise di/dt at point in time $t_0=0$ may be evaluated. With $di/dt=\Delta i/\Delta t$, based on the above equation the inductance L is given as $$L = \frac{u_0}{\Delta i}\Delta t.$$

$\Delta t$ is predefined, and the current $\Delta i$ at this point in time is measured or determined from the measured current i as a response to the voltage jump. This takes place in the evaluation unit 10, for example.

Alternatively, the inductance L of a drive coil 5 could also be determined by applying harmonic signals (sine, cosine) to a drive coil 5 (voltage u, for example) and evaluating the magnitude and phase shift of the response (current i, for example).

Figure 6:
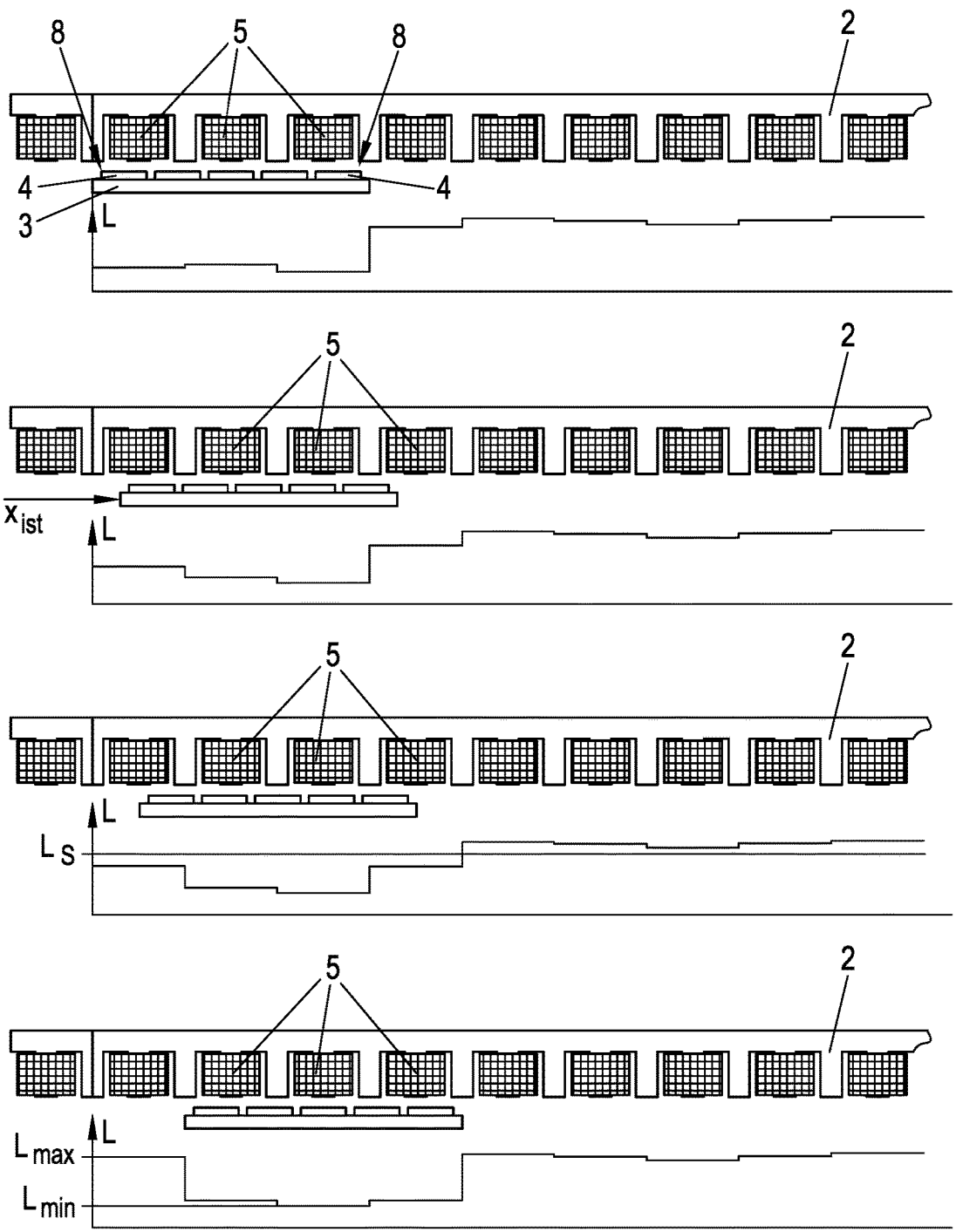
FIG. 6 shows another possible method for determining an edge area of the arrangement of drive magnets on the rotor.

The result is illustrated in FIG. 6 by way of example. Different inductances L for the drive coils 5 result, depending on the position $x_{ist}$ of the rotor 3. The influence on the inductance L of a drive coil 5 by the magnetic field of a drive magnet 4 is clearly apparent here. Without an influence, i.e., at locations where no drive magnet 4 comes to rest in the area of a drive coil 5, the inductance $L_{max}$ is at a maximum. In contrast, the inductance $L_{min}$ is at a minimum in the area of the arrangement of drive magnets 4. The inductance L will lie somewhere in between in the edge area 8 of the arrangement of drive magnets 4. The value of the inductance in this area is a function of the position of the rotor 3 relative to the drive coil 5 in the edge area 8. This relationship may be determined empirically or by simulation, for example, and may be assumed to be known. Thus, based on the determined value of the inductance L of the drive coil 5, once again at least one edge area 8 of the rotor 3 may be determined, for example by checking whether the inductance L of the drive coil is less than a predefined threshold value $L_S$ (<80% $L_{max}$, for example). With this knowledge, the determination of the exact absolute position $x_{ist}$ of the rotor 3 when the linear motor 1 is being switched on may then be determined analogously to the description above.

For this method, the inductances L of all drive coils Sn, or at least the drive coils Sn for which the rotor 3 is presumed, are to be determined. For example, the last position before switching off the linear motor 1 may be stored. It may therefore be assumed that the rotor 3 will still be approximately at this position, and it would be possible to determine and evaluate only the inductances L of the drive coils Sn in these surroundings.

Figure 7:
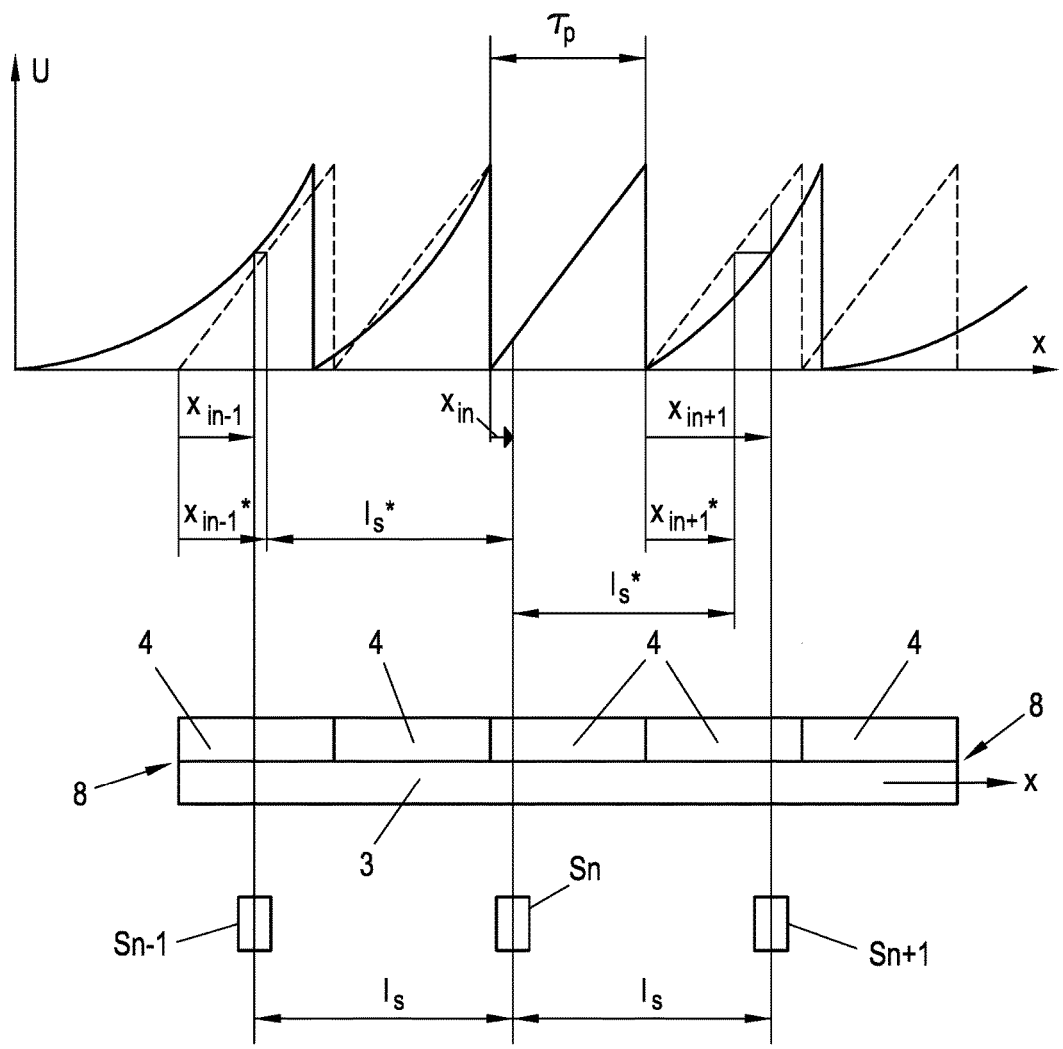
FIG. 7 shows yet another possible method for determining an edge area of the arrangement of drive magnets on the rotor.

Another option for determining an edge area 8, and thus the rough position of the rotor 3, makes use of the fact that, based on the field line pattern of the magnetic field generated by the drive magnets 4 (as illustrated in FIG. 2, for example), a sensor signal cycle 11 in the form of a sawtooth, recorded with a position sensor Sn, is to be expected only in the area of the center of the rotor 3, i.e., where the field lines extend approximately perpendicularly with respect to the drive magnets 4. Away from the center, a sensor signal cycle 11 is nonlinearity distorted and a pole expansion occurs, i.e., the width of the sensor signal cycle 11 no longer matches the pole pitch $\tau_p$ of a drive magnet 4. This is illustrated in FIG. 7, using the example of a rotor 3 having five drive magnets 4. A position sensor Sn in the area of the center of the rotor 3 would deliver an essentially ideal sawtooth during movement, whereas position sensors Sn−1, Sn+1, situated away from the center, without appropriate correction would deliver distorted sawteeth (illustrated by solid lines). This nonlinear distortion and pole expansion is generally corrected during operation, so that a fine position determination with a position sensor Sn−1, Sn+1, also away from the center, is still possible. However, this nonlinear distortion may now also be used for determining an edge area 8.

It is immediately apparent that in the ease of an ideal sawtooth (indicated in dashed lines in FIG. 7) in the sensor signal cycles 11, the distance between two position sensors Sn−1, Sn or Sn, Sn+1 or Sn−1, Sn+2, which must correspond to the known sensor distance $l_s$ or a multiple thereof, may be determined based on the relative positions $x_{in-1}$, $x_{in}$, $x_{in+1}$ measured with the position sensors Sn−2, Sn, Sn+1 and the known geometry of the rotor 3. In contrast, when the nonlinearly distorted signal is evaluated, based on the measured relative positions $x_{in-1}^*$, $x_{in}^*$, $x_{in+1}^*$, a sensor distance $l_s^*$, as a physical variable that is a function of the magnetic field of the drive magnets, is determined between two position sensors Sn−1, Sn or Sn, Sn+1 or Sn+1, Sn+2, which will deviate from the known sensor distance $l_s$. This deviation may be evaluated in order to determine the edge area 8. For example, an edge area 8 could be assumed in the area of a position sensor Sn−1 when the distance $l_s^*$ (preferably as the absolute value) with respect to the neighboring position sensor Sn falls below a certain predefined limit value. With this knowledge, the determination of the exact absolute position $x_{ist}$ of the rotor 3 may then be determined analogously to the description above.

The described methods for determining the edge areas 8, and thus the rough position of the rotor 3, may be used as an alternative or also in arty desired combination. The combination may result in higher accuracy (due to control options or by combining the results, for example by average value formation) and in greater fail-safe reliability due to redundancy. The reliability of the two described methods is also different. The method with determination of the amplitudes A is most accurate in the area of the position sensors Sn, i.e. when the edge area 8 is situated there, whereas the method with determination of the inductances L is most accurate in the area of the center points of the drive coils 5. The combination may also balance out these differing accuracies, or one result may be preferred over the other result, depending on the position of the rotor 3.

Although the method for determining the absolute position $x_{ist}$ of a rotor 3 has been described using the example of switching on the linear motor 1, it is apparent that the method may also be applied in other situations. For example, on a long stator linear motor as a linear motor 1, a rotor 3 could be added at a certain location, even during operation. The exact absolute position $x_{ist}$ of the added rotor 3 could then be determined with the method according to the invention. Disturbances are also conceivable, which after being eliminated require the absolute position $x_{ist}$ of a rotor 3 to be redetermined during operation.

It is likewise conceivable to use the method according to the invention for determining the absolute position $x_{ist}$ of a rotor 3 in applications other than linear motors. In the general case, the rotor 3 is movably situated with respect to a stationary part in the direction of movement x. The stationary part may be a stator 2 or a long, stator of a linear motor, but may also be some other component. The position sensors Sn are then arranged on the stationary component as described above, and the absolute position $x_{ist}$ of the rotor 3 may then be determined as described above, based on a stationary reference position.

What is claimed:

1. A method for determining the absolute position of a rotor of a linear motor that is movable with respect to a stationary part in a direction of movement, wherein an arrangement of drive magnets, which comprises a plurality of drive magnets arranged adjacently in the direction of movement of the rotor, is provided on the rotor, and a plurality of position sensors, which detect a magnetic field of a drive magnet of the arrangement of drive magnets in the an area of the position sensor, are stationarily arranged at a distance from one another on the stationary part in the direction of movement of the rotor comprising:

determining at least one edge area of the arrangement of drive magnets in a direction of movement; and deriving from the determined at least one edge area of the arrangement of drive magnets a rough position of the rotor on the stationary part;

determining from the rough position of the rotor and a known geometry of the rotor a specific drive magnet of the arrangement of drive magnets with a magnetic field being detected by at least one position sensor of the plurality of position sensors in an area of the arrangement of drive magnets;

determining, via the at least one position sensor, a relative position of the specific drive magnet with respect to the at least one position sensor, and determining an absolute position of the rotor on the stationary part from a known mounting position of the at least one position sensor on the stationary part and from the determined relative position.

2. The method according to claim 1, wherein, for determining the absolute position of the rotor, a number of drive magnets measured in succession with the at least one position sensor is considered as an increment.

3. The method according to claim 1, wherein, according to a predefined criterion, switching to a position sensor that is following in the direction of movement of the rotor, as the at least one position sensor in order to determine the absolute position of the rotor.

4. The method according to claim 1, wherein the determining the at least one edge area comprises determining and evaluating a physical variable that is a function of the magnetic field of the drive magnets.

5. The method according to claim 4, further comprising determining an absolute value of a sensor signal of a position sensor in the area of the arrangement of the drive magnets, and drawing a conclusion concerning an edge area with the determined absolute value.

6. The method according to claim 5, wherein the conclusion concerning the edge area is drawn when the absolute value falls below a predefined threshold value.

7. The method according to claim 4, further comprising determining an inductance of a drive coil in the area of the arrangement of drive magnets, and drawing a conclusion concerning an edge area with the determined inductance.

8. The method according to claim 7, wherein the conclusion concerning the edge area is drawn when the inductance falls below a predefined threshold value.

9. The method according to claim 4, wherein a sensor signal cycle of a position sensor that is nonlinearly distorted due to the magnetic field of the arrangement of drive magnets is used for determining a relative position of a drive magnet of the arrangement of drive magnets with respect to a position sensor, and on this basis, a sensor distance of the position sensor from another position sensor in the area of the arrangement of drive magnets is determined, and a conclusion concerning an edge area is drawn with the sensor distance.

10. The method according to claim 9, wherein the conclusion concerning an edge area is drawn when a difference between the sensor distance determined based on the distorted sensor signal cycle and a known actual sensor distance falls below a predefined threshold value.

11. The method according to claim 5, wherein at least two physical variables are evaluated for determining the at least one edge area.

12. A linear motor comprising:
a stator;
a rotor that is movable along the stator;
an arrangement of drive magnets comprising a plurality of drive magnets arranged adjacently in a direction of movement of the rotor with a pole pitch being provided on the rotor; and
a plurality of position sensors being stationarily arranged on a stationary part at a distance from one another at a sensor distance in the direction of movement of the rotor, wherein the sensor distance is greater than the pole pitch of the plurality of drive magnets,
wherein a position sensor of the plurality of position sensors is configured to detect a magnetic field of a drive magnet of the arrangement of the drive magnets in an area of the position sensor,
an evaluation unit is configured to determine an edge area of the arrangement of drive magnets in a direction of movement, to derive from the determined edge area of the arrangement of the drive magnets a rough position of the rotor on the stationary part and to determine from the derived rough position of the rotor and a known geometry of the rotor a specific drive magnet of the arrangement of drive magnets having a magnetic field detected by at least one position sensor of the plurality of position sensors in an area of the arrangement of drive magnets,
wherein the at least one position sensor is further configured to determine a relative position of the measured drive magnet with respect to the at least one position sensor, and
wherein the evaluation unit is further configured to determine an absolute position of the rotor on the stationary part from a known mounting position of the at least one position sensor on the stationary part and from the determined relative position.

* * * * *